United States Patent
Motoyama et al.

[11] Patent Number: 5,123,399
[45] Date of Patent: Jun. 23, 1992

[54] AIR FUEL INJECTOR ASSEMBLY

[75] Inventors: Yu Motoyama; Junichi Kaku, both of Iwata, Japan

[73] Assignee: Yamaha Hatsudoki Kabushiki Kaisha, Iwata, Japan

[21] Appl. No.: 591,960

[22] Filed: Oct. 2, 1990

[30] Foreign Application Priority Data
Oct. 2, 1989 [JP] Japan .................. 1-257451

[51] Int. Cl.5 .................. F02M 23/00; F02M 55/02
[52] U.S. Cl. .................. 123/531; 123/469; 123/533; 123/73 C
[58] Field of Search .................. 123/468, 469, 470, 472, 123/531, 533, 73 C, 73 CC

[56] References Cited
U.S. PATENT DOCUMENTS

| | | | |
|---|---|---|---|
| 4,224,904 | 9/1980 | Clerk | 123/531 |
| 4,429,674 | 2/1984 | Lubbing | 123/531 |
| 4,517,941 | 5/1985 | Nakajawa | 123/531 |
| 4,794,901 | 7/1989 | Hong et al. | 123/73 C |
| 4,926,806 | 5/1990 | Ahern et al. | 123/531 |
| 4,934,329 | 6/1990 | Lear et al. | 123/531 |
| 4,962,745 | 10/1990 | Ohno et al. | 123/533 |
| 4,984,540 | 1/1991 | Morikawa | 123/73 C |

Primary Examiner—Tony M. Argenbright
Assistant Examiner—Thomas N. Moulis
Attorney, Agent, or Firm—Ernest A. Beutler

[57] ABSTRACT

A fuel air injection system for a multiple cylinder engine wherein an air manifold is rigidly affixed to all of the fuel air injectors so as to form a unitary assembly that can be removed from the engine as a unit.

9 Claims, 5 Drawing Sheets

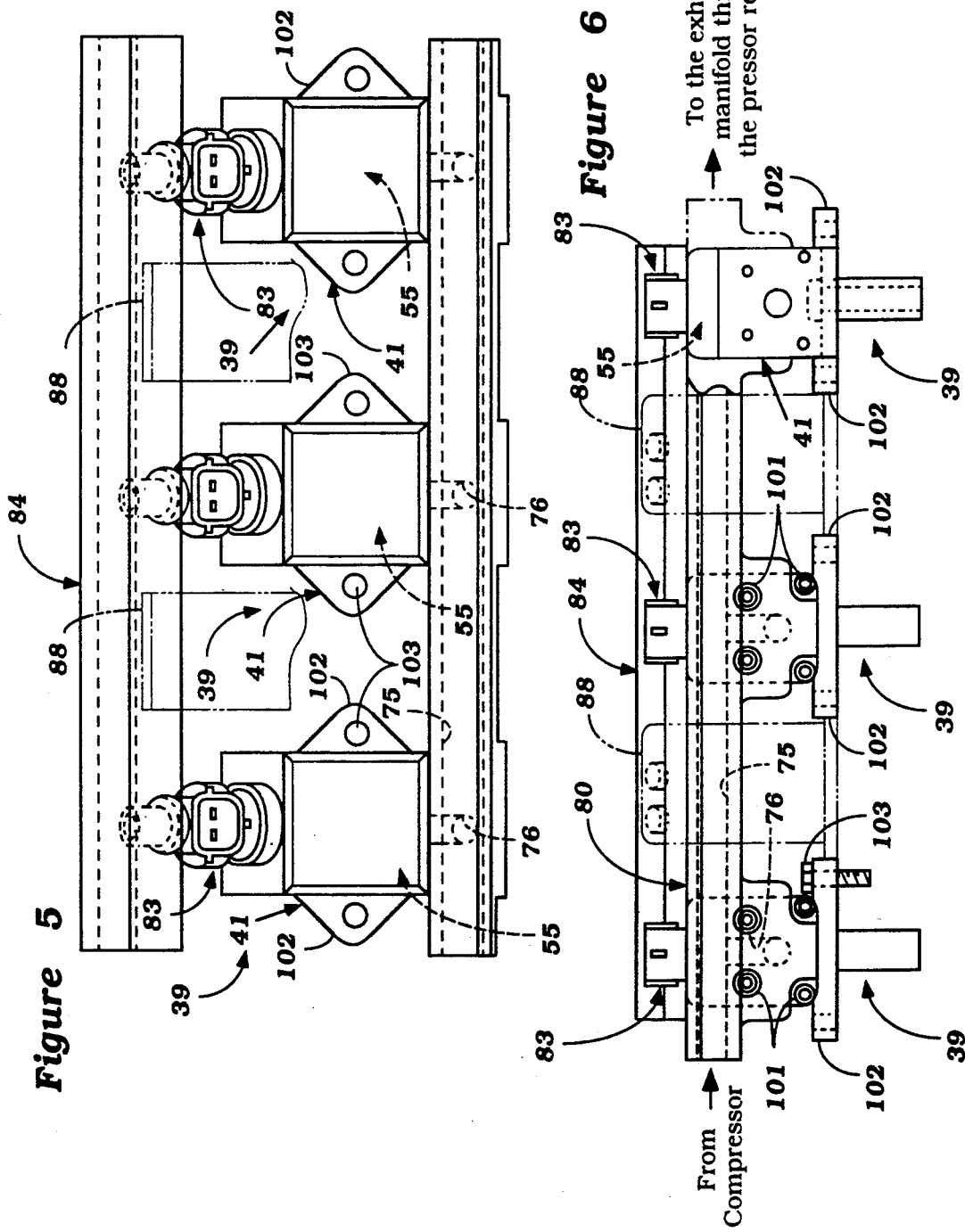

AIR FUEL INJECTOR ASSEMBLY

BACKGROUND OF THE INVENTION

This invention relates to an air fuel injector assembly for engines and more particularly to a compound air fuel injector assembly that can be removed as a unit from the engine for servicing.

Air fuel injectors for engines have been known for many, many years. Such injectors have the advantage of insuring good mixture of the fuel within the combustion chamber due to the injection of both fuel and air under pressure. However, the use of air fuel injectors gives rise to certain problems in that when multiple cylinder engines are employed, both an air and a fuel manifold must be provided for supplying the air and fuel to the various injector. This means there are considerable servicing difficulties with the prior art type of constructions since the manifold must first be removed in order to access the individual fuel injectors.

It is, therefore, a principal object of this invention to provide an improved air fuel injection system for a multiple cylinder engine wherein servicing is facilitated.

It is a further object of this invention to provide an air fuel injection system for a multiple cylinder engine wherein all of the air fuel injectors and certain of the manifolding can be removed as a unit for servicing.

SUMMARY OF THE INVENTION

This invention is adapted to be embodied in an air fuel injection system for a multiple cylinder engine that is comprised of a plurality of air fuel injectors. An air manifold is provided for supplying air to the air fuel injectors and a fuel manifold is provided for supplying fuel to the air fuel injectors. At least one of these manifolds is affixed directly to the injectors for removal of the injectors from the engine as a unit along with this manifold.

BRIEF DESCRIPTION OF THE DRAWINGS

FIG. 5 is a top plan view of the fuel injector assemblies.

FIG. 6 is a side elevational view of the fuel injection assemblies looking from the side to which the air manifold is affixed.

DETAILED DESCRIPTION OF THE PREFERRED EMBODIMENT

Figure 1:
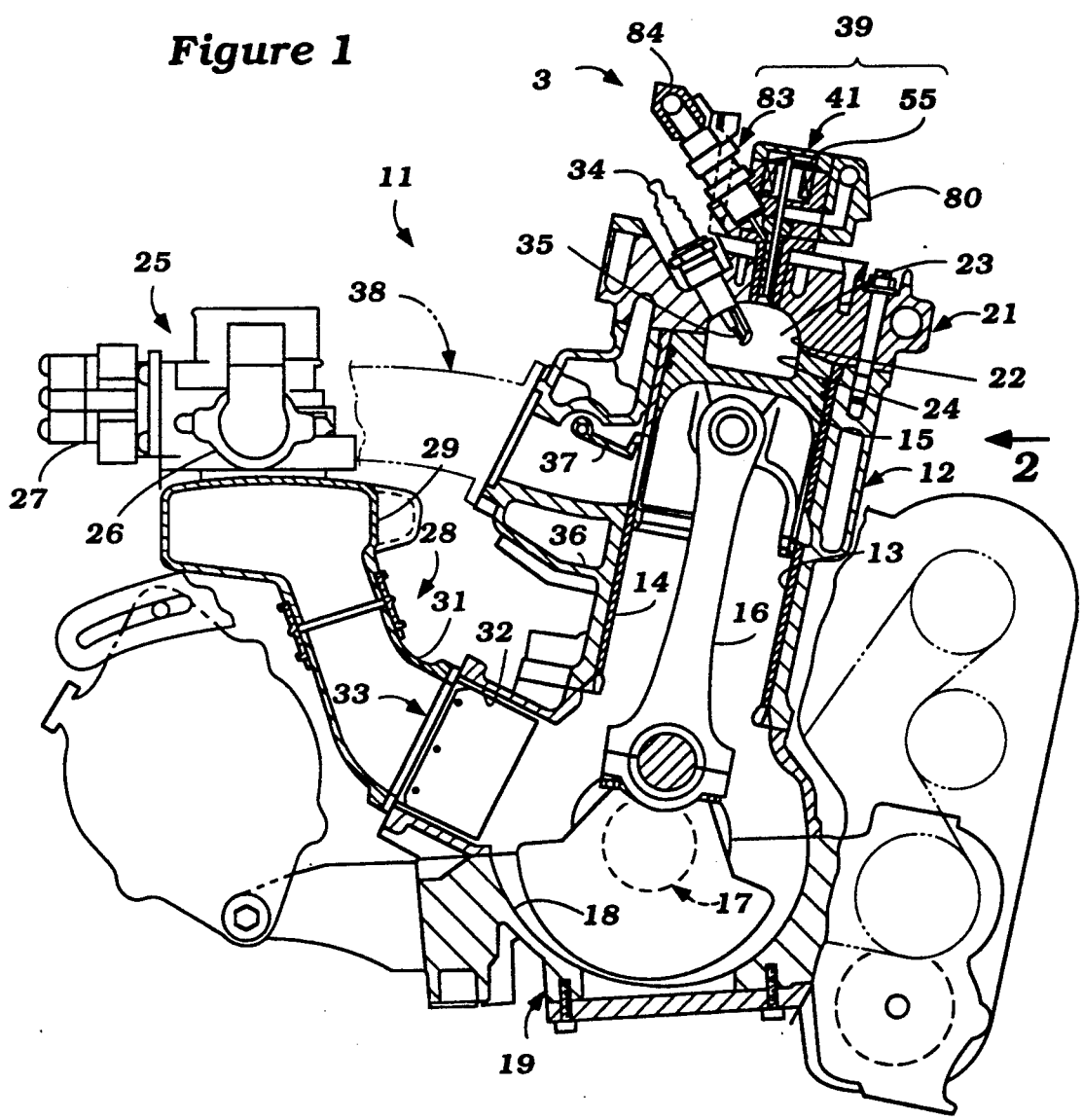
FIG. 1 is a cross sectional view taken through one cylinder of a multiple cylinder, two cycle, crankcase compression engine constructed in accordance with an embodiment of the invention.
Figure 2:
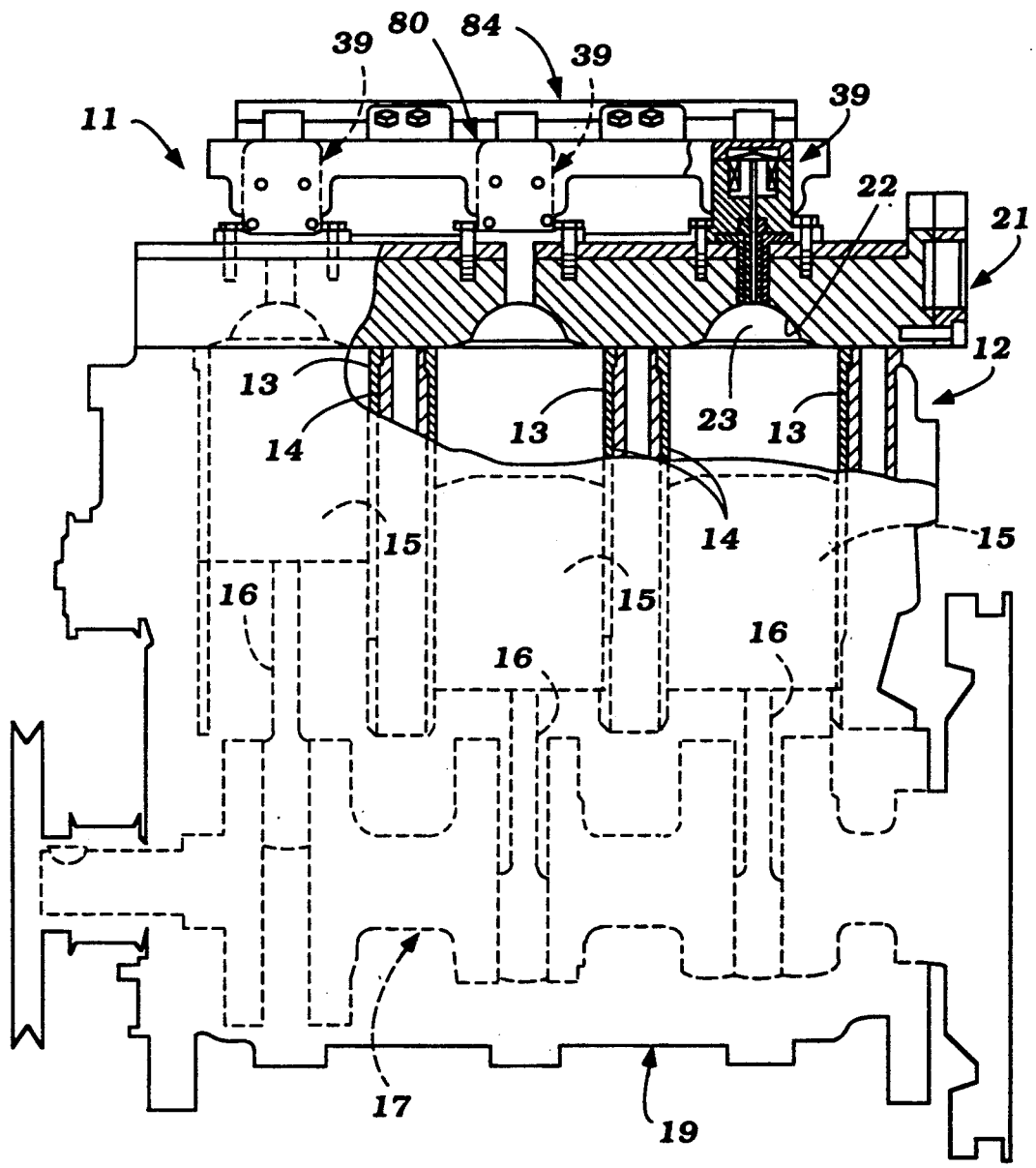
FIG. 2 is a side elevational view, with portions broken away, of the engine and looking generally in the direction of the arrow 2 in FIG. 1.

Referring now in detail to the drawings and initially primarily to FIGS. 1 and 2, a three cylinder, in line, two cycle, crankcase compression, internal combustion engine constructed in accordance with an embodiment of the invention is identified generally by the reference numeral 11. The engine 11 is, as noted, illustrated to be a three cylinder, in line type engine. It is to be understood, however, that the invention may be also employed in conjunction with engines having other numbers of cylinders and other cylinder orientations. In fact, certain features of the invention can be utilized in conjunction with rotary rather than reciprocating type engines and, in addition, some features of the invention may also be employed in engines operating on the four stroke rather than two stroke principle. The invention, however, has particular utility in conjunction with two stroke engines.

The engine 11 is comprised of a cylinder block assembly, indicated generally by the reference numeral 12, in which three aligned cylinder bores 13 are formed by cylinder liner 14 that are received within the cylinder block 12 in a known manner. Pistons 15 are supported for reciprocation within each of the cylinder bores 14 and are connected by means of respective connecting rods 16 to a crankshaft 17 that is journaled for rotation within a crankcase chamber 18 formed by the cylinder block 12 and a crankcase 19 in a known manner.

A cylinder head assembly 21 is affixed to the cylinder block 12 and has individual recesses 22 which cooperate with the piston 15 and cylinder bore 13 to form combustion chambers 23. The heads of the pistons 15 are provided with bowls 24 so as to further form these combustion chambers 23.

An air charge is delivered to the crankcase chambers 18 associated with each of the cylinder bores 13 by an induction system that includes a throttle body, indicated generally by the reference numeral 25, that receives air from an air cleaner (not shown). This throttle body 25 includes a throttle valve (not shown) which is manually operated and the position of which is sensed by a potentiometer 26 to provide a throttle valve position signal for controlling the fuel injection system to be described. In addition, a sub injector 27 may be provided in the throttle body 25 so as to inject additional fuel under certain running conditions.

The throttle body 25 delivers the air to an induction system, indicated generally by the reference numeral 28, and which includes a plenum chamber 29. The plenum chamber supplies air through manifolds 31 to inlet ports 32 associated with each crankcase chamber 18. These crankcase chambers 18 are sealed from each other, as is typical with two cycle engine practice. A reed type check valve 33 is positioned in each inlet port 32 so as to prevent reverse flow when the charge is being compressed in the crankcase chambers 18 by downward movement of the pistons 15.

The compressed charge is transferred to the combustion chambers 23 through suitable scavenge passages (not shown). This charge is then further compressed in the combustion chambers 23 by the upward movement of the pistons 15 and is fired by a spark plug 34 mounted in the cylinder head 21 with its gap 35 extending into the combustion chamber 23.

The burnt charge is then discharged from the combustion chambers 23 through exhaust ports 36 in which exhaust control valves 37 are provided. The exhaust control valves 37 are operated so as to provide a reduced compression ratio under high speed, high load operating conditions in a suitable manner. The exhaust gases are then discharged to the atmosphere through an exhaust system which includes an exhaust manifold 38.

The fuel charge for the combustion and an additional air charge is supplied by injector units 39 which are shown in most detail in the remaining figures and will now be described by reference additional to these remaining figures.

The injectors 39 include a housing assembly, indicated generally by the reference numeral 41, which is comprised of a lower housing piece 42 and an upper housing piece 43. The lower housing piece 42 has a cylindrical portion 44 that is received within a suitable bore formed in the cylinder head and terminates at a nozzle portion 45. The nozzle portion 45 is formed by an insert, indicated generally by the reference numeral 46, which has a cylindrical portion 47 that is disposed radially inwardly of a bore 48 formed in the cylindrical portion 44 of the lower housing portion piece 42. This forms a chamber 49 to which fuel is delivered, in a manner to be described. The nozzle opening 45 is formed by an enlarged diameter portion of the insert 46.

An injection valve, indicated generally by the reference numeral 51, has a head portion 52 that cooperates with the nozzle seat 45 so as to open and close it. The injection valve 51 has a reduced diameter portion 53 that extends through a bore in the insert piece 46 and which is connected at its upper end to an armature plate 54 of a solenoid assembly, indicated generally by the reference numeral 55. The upper end of the valve stem 53 is threaded as at 56 so as to receive a nut 57 to provide an adjustable connection to the armature plate 54.

A coil compression spring 58 acts against the armature plate 54 and urges the injection valve 51 to its normal closed position as shown in the figures of the drawing. A solenoid winding 59 encircles the upper end of the valve stem 53 and when energized will attract the armature plate 54 downwardly to compress the spring 58 and open the injection valve 51.

The valve stem 51 is provided with upper and lower extension lugs 61 and 62 that slidably engage the bore in the insert piece 46 so as to support the valve 51 for its reciprocal movement without interfering with the air flow therepast.

The cylindrical portion 44 of the housing piece 42 is formed with one or more annular grooves in which an O ring seal 63 is provided for sealing with the cylinder head. In a like manner, its internal surface is formed with an annular groove so as to receive an O ring seal 64 which seals with the enlarged end of the insert 46.

The housing piece 42 has an enlarged flange 65 formed at its upper end which is received within a counterbore formed in the lower face of the housing piece 43. Socket headed screws 66 affixed the housing pieces 42 and 43 to each other and an O ring seal 67 provides a seal between these pieces. The insert piece 46 has an enlarged headed portion 68 that is received within a bore formed in the housing piece 43 at the base of the counterbore which receives the flange 65 of the housing piece 42. Above this bore, the housing piece 43 is provided with a further bore that receives a sleeve 69 that is threaded to the core of the solenoid winding 59 and against which the coil compression spring 58 bears. This sleeve 69 provides a combined mounting function for the winding 59 and preload adjustment for the spring 58. The sleeve 69 is held in position by means of a lock screw 71 which is threaded through the housing piece 43 and which is accessible through an opening 72 formed in the side thereof. The opening 72 also admits air, in a manner to be described, which can flow through a slotted opening 73 in the sleeve 69 so as to be received in a gap 74 formed around the valve stem 53 and the interior of the insert piece 46.

The air is delivered to the opening 72 from an air manifold, indicated generally by the reference numeral 80, and which is affixed to the injector bodies in a manner to be described. The air manifold 80 has a transversely extending passage 75, one end of which is connected to a regulated source of air pressure (not shown). The bore 75 is intersected by crossbores 76, the outer ends of which are closed by plugs 77. The manifold 80 is further provided with intersecting passages 78 which communicate with the openings 72 in the housing piece 43 so as to permit air under pressure to enter the aforenoted chamber 74.

Air leakage from around the solenoid 55 is precluded by means of a cap 81 that is affixed to the upper end of the housing piece 43 and which engages an O ring seal 82.

Figure 3:
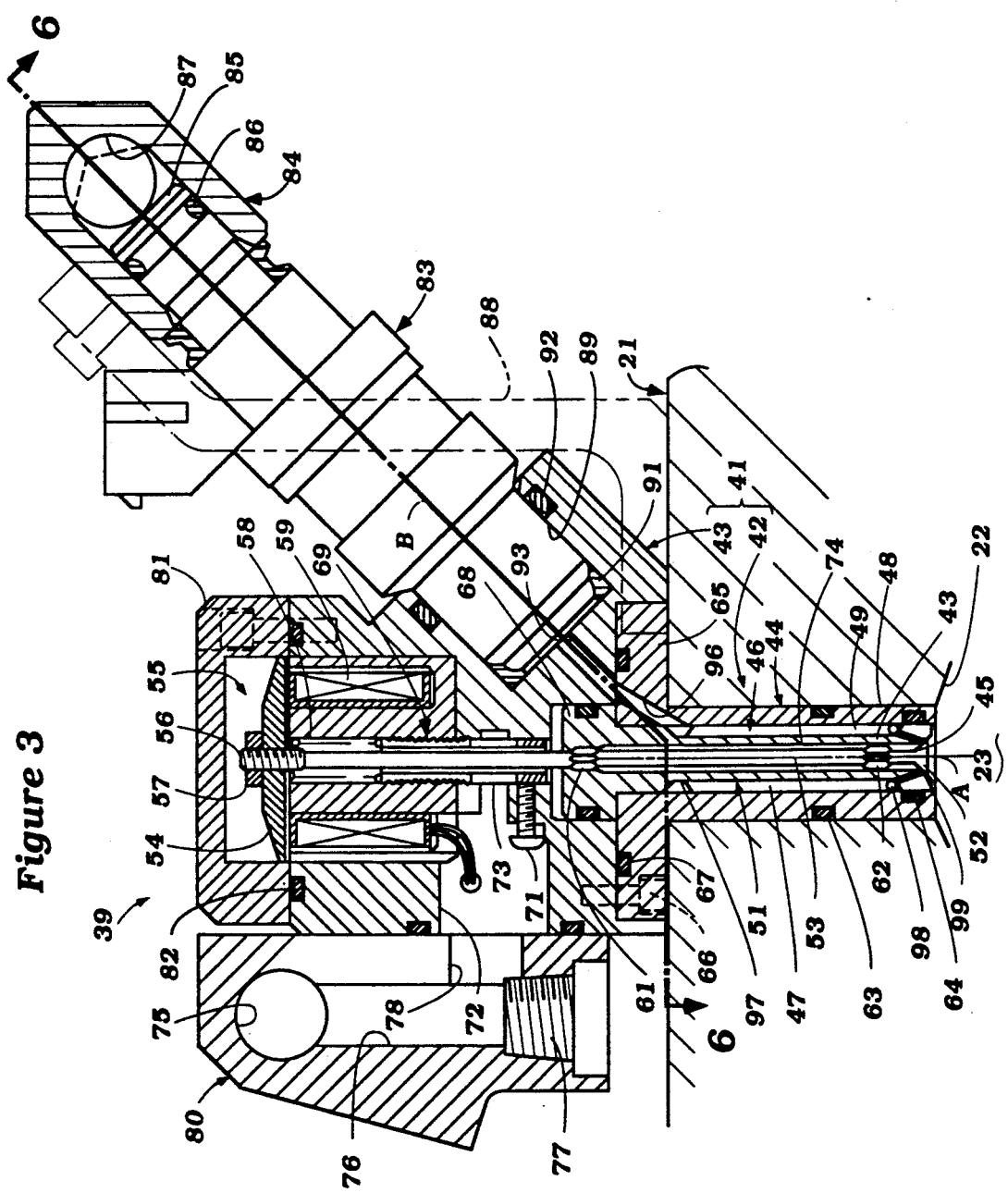
FIG. 3 is a cross sectional view taken through one of the injectors on the same plane as FIG. 1 but looking in the opposite direction.
Figure 4:
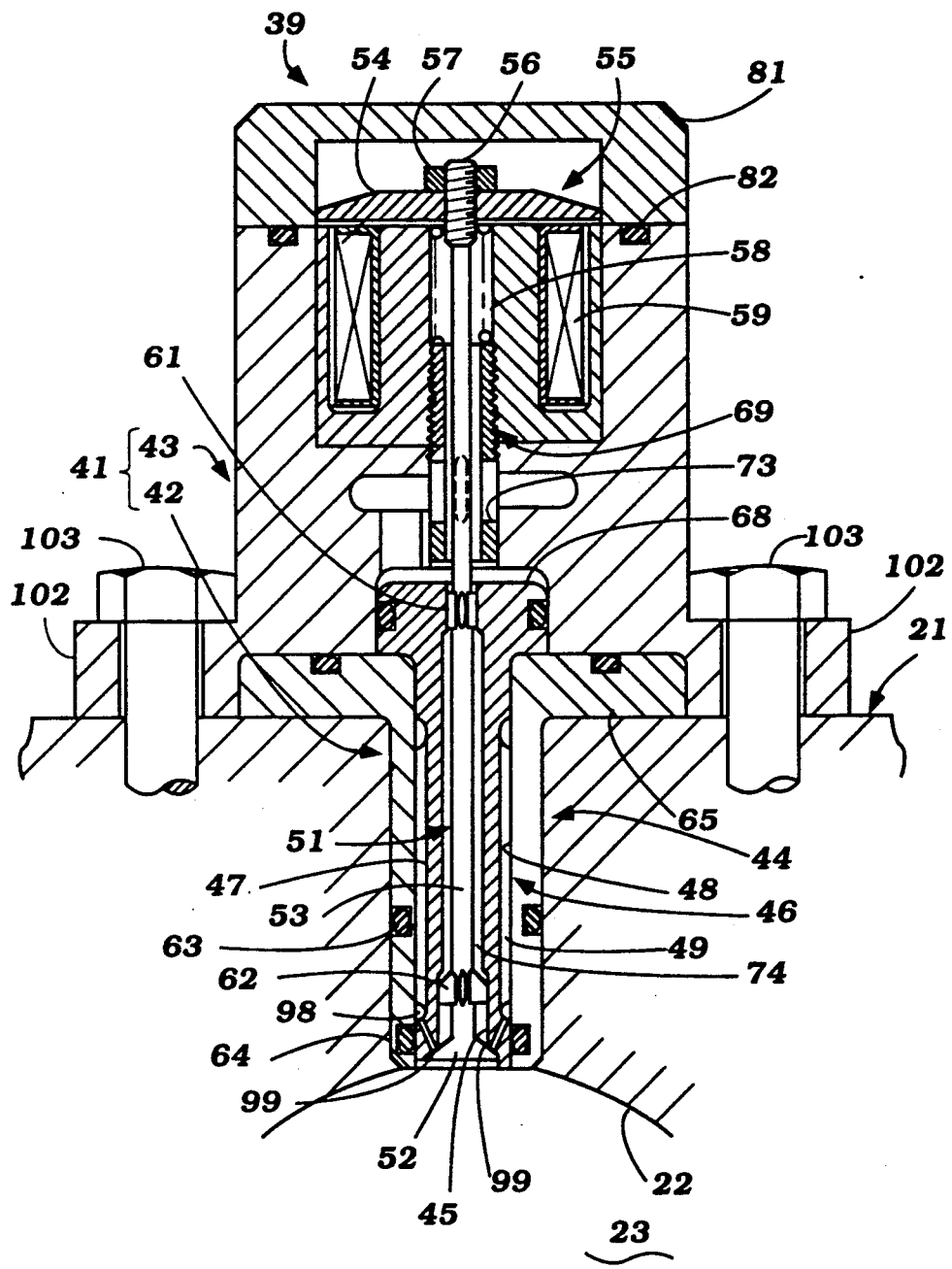
FIG. 4 is a cross sectional view taken along a plane perpendicular to the plane of FIG. 3.

A fuel injector 83 is provided for each of the injectors 39. The fuel injectors 83 may be of any known type. Fuel is delivered to all of the fuel injectors 83 by a fuel manifold 84 that is affixed to the tips 85 (FIGS. 3, 5 and 6) of the fuel injectors 83 and which are sealed thereto by O ring seals 86. A manifold line 87 which communicates with a regulated pressure fuel source (not shown) delivers the fuel to the fuel injectors 83. The fuel manifold 84 is mounted on a mounting bracket that is shown in phantom in FIG. 4 and which is identified by the reference numeral 88.

For ease of location, the housing piece 43 is formed with a bore 89 that is disposed at approximately a 45 degree angle as shown by the line B to the axis A of the injector valve 51. These bores 89 receive the nozzle portions of the injectors 83. O ring seals 91 and 92 provide a sealing function around these nozzle portions so that the fuel which issues from the injectors 83 will be directed toward a passage 93 bored into the housing piece 43. These passages extend from the bores 89 and specifically from shoulders 94 formed at the base of these bores 89. The fuel injector nozzle end portions 95 are spaced slightly from the end walls 94 so as to provide a chamber through which the fuel will be injected. By using this close spacing, no significant dead space exits between the injector nozzle and the passage 93. Dead space will be eliminated and better fuel injection control can be obtained.

The housing piece passage 93 is intersected by corresponding passage 96 formed in the housing piece 42. These passages terminate in an annular recess 97 formed in the periphery of the insert 46 so as to communicate the fuel with the chamber 49. At the lower end of the chamber 49, there is provide another annular relief 98 that is intersected by a plurality of ports 99 that extend through the lower end of the enlargement of the insert piece 46 at the valve seat 45. Hence, when the valve head 52 moves to its open position, both fuel and air will be valved into the combustion chambers 23.

It has been previously noted that the air manifold 80 has been affixed to each of the injectors 39. As may be best seen in FIG. 6, this is achieved by a plurality of socket headed screws 101. By forming the air manifold from a relative rigid material such as aluminum extrusion, an aluminum die casting or rigid plastic, enough rigidity can be added to the system so that all of the injectors 39 and air manifold 80 can be removed from the engine as a unit.

The assembly is mounted to the engine by means of mounting lugs 102 formed on the injector housing portions 43 through which threaded fasteners 103 extend. Hence, the unitary assembly consisting of the individual injector nozzles 39 and air manifold 80 can be removed from the engine easily by removing the socket headed screws 83 and the entire assembly. This obviously facilitates servicing.

It should be readily apparent that the foregoing description is that of a preferred embodiment of the invention and that various changes and modifications may be made without departing from the spirit and scope of the invention, as defined by the appended claims.

We claim:

1. A rigid air fuel injection assembly for attachment as a unit to a multiple cylinder engine, said assembly comprising a plurality of air fuel injectors each having valved chamber means adopted to communicate with a respective combustion chamber of said engine, at least one fuel injection nozzle mounted directly and rigidly to each of said air fuel injectors for delivering fuel to the respective chamber means of said air fuel injector, a fuel manifold for delivering fuel to said fuel injection nozzle, an air manifold for delivering compressed air to said chamber means of fuel air injectors, at least one of said manifolds being formed from a relatively rigid material and being directly and rigidly affixed to said fuel air injectors for removal of all of said fuel air injectors, said fuel injectors and said manifold as an assembly from said engine and means for rigidly connecting said assembly to a cylinder head of said engine.

2. An air fuel injection unit as set forth in claim 1 wherein the manifold affixed to the fuel air injectors comprises the air manifold.

3. An air fuel injection unit as set forth in claim 2 wherein the fuel air injectors are comprised of a housing assembly having a lower piece adapted to extend into the cylinder head and having an enlarged portion received in a bore of a second housing piece that is adapted to be affixed to the cylinder head.

4. An air fuel injection unit as set forth in claim 3 wherein the air manifold is affixed to the second housing piece.

5. An air fuel injection unit as set forth in claim 1 wherein the air fuel injectors comprise housing assemblies with the fuel injection nozzles being disposed on one side of said housing assembly and the air manifold being disposed on the other side of the housing assembly.

6. An air fuel injection unit as set forth in claim 5 wherein the air manifold extends in a direction generally parallel to the axis of rotation of the engine output shaft.

7. An air fuel injection unit as set forth in claim 6 wherein the fuel manifold is disposed on the opposite side of the housing assembly from the air manifold and on the same side as the fuel injection nozzles.

8. An air fuel injection unit as set forth in claim 1 wherein the manifold is affixed by threaded fastening means to the fuel air injectors for removal of the fuel air injectors as a unit with the manifold.

9. An air fuel injection unit as set forth in claim 4 wherein the air manifold is affixed by threaded fastening means to the fuel air injectors for removal of the fuel air injectors as a unit with the air manifold.

* * * * *